(12) United States Patent
Roy et al.

(10) Patent No.: US 11,555,458 B2
(45) Date of Patent: Jan. 17, 2023

(54) METHODS AND SYSTEMS FOR DETECTING AND RESPONDING TO AN ENGINE DISTURBANCE

(71) Applicant: PRATT & WHITNEY CANADA CORP., Longueuil (CA)

(72) Inventors: Benjamin Roy, Montreal (CA); Bryan Fishbein, Toronto (CA); Timothy Arulsuthan, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 167 days.

(21) Appl. No.: 17/163,981

(22) Filed: Feb. 1, 2021

(65) Prior Publication Data
US 2022/0243669 A1    Aug. 4, 2022

(51) Int. Cl.
| | |
|---|---|
| *F02C 9/52* | (2006.01) |
| *F02C 9/54* | (2006.01) |
| *F02C 9/28* | (2006.01) |
| *F04D 27/00* | (2006.01) |

(Continued)

(52) U.S. Cl.
CPC ............... *F02C 9/52* (2013.01); *F02C 7/262* (2013.01); *F02C 9/18* (2013.01); *F02C 9/28* (2013.01); *F02C 9/54* (2013.01); *F04D 27/001* (2013.01); *F05D 2220/323* (2013.01); *F05D 2270/083* (2013.01); *F05D 2270/092* (2013.01);

(Continued)

(58) Field of Classification Search
CPC ...... F02C 9/00; F02C 9/18; F02C 9/28; F02C 9/52; F02C 9/54; F02C 7/262; F05D 2220/323; F05D 2270/083; F05D 2270/092; F05D 2270/101; F05D 2270/301; F05D 2270/304; F04D 27/001; F01D 21/003
See application file for complete search history.

(56) References Cited

U.S. PATENT DOCUMENTS

| | | |
|---|---|---|
| 2006/0112697 A1 | 6/2006 | Rowe |
| 2020/0102894 A1* | 4/2020 | Duge .................. F02C 7/272 |
| 2020/0173369 A1 | 6/2020 | Husband et al. |

OTHER PUBLICATIONS

European Patent Office, Communication re. extended European search report for European patent application No. 22154516.3, dated Jul. 5, 2022.

* cited by examiner

*Primary Examiner* — Loren C Edwards
(74) *Attorney, Agent, or Firm* — Norton Rose Fulbright Canada LLP

(57) ABSTRACT

Methods and systems for detecting and responding to an engine disturbance are described. The method comprises monitoring a rate of change of a combustor pressure of an engine, detecting an engine disturbance when the rate of change of the combustor pressure falls below an event detection threshold, initiating an engine recovery sequence in response to detecting the engine disturbance, confirming a surge event when the rate of change of the combustor pressure increases above a surge confirmation threshold within a flameout confirmation time period after having crossed the event detection threshold, applying a surge recovery sequence in response to confirming the surge event, confirming a flameout event when the flameout confirmation time period expires and the rate of change of the combustor pressure remains below the surge confirmation threshold (Continued)

after having crossed the event detection threshold, and applying a flameout recovery sequence in response to confirming the flameout event.

20 Claims, 7 Drawing Sheets

(51) Int. Cl.
*F02C 7/262* (2006.01)
*F02C 9/18* (2006.01)
(52) U.S. Cl.
CPC .. *F05D 2270/101* (2013.01); *F05D 2270/301* (2013.01); *F05D 2270/304* (2013.01)

METHODS AND SYSTEMS FOR DETECTING AND RESPONDING TO AN ENGINE DISTURBANCE

TECHNICAL FIELD

The application relates generally to detecting and responding to engine disturbances such as engine surges and engine flameouts.

BACKGROUND OF THE ART

A disturbance in a gas turbine engine may be the result of an instability in the engine's operating cycle. The disturbance may be caused by various factors, such as weather, foreign object damage, and engine deterioration. An engine controller should be able to detect abnormal engine operation and to react promptly in order for the engine to recover rapidly from any adverse effects that such events may have. While existing methods for detecting engine disturbances are suitable for their purposes, improvements are desired.

SUMMARY

In one aspect, there is provided a method for detecting and responding to an engine disturbance. The method comprises monitoring a rate of change of a combustor pressure of an engine, detecting an engine disturbance when the rate of change of the combustor pressure falls below an event detection threshold, initiating an engine recovery sequence in response to detecting the engine disturbance, confirming a surge event when the rate of change of the combustor pressure increases above a surge confirmation threshold within a flameout confirmation time period after having crossed the event detection threshold, applying a surge recovery sequence in response to confirming the surge event, confirming a flameout event when the flameout confirmation time period expires and the rate of change of the combustor pressure remains below the surge confirmation threshold after having crossed the event detection threshold, and applying a flameout recovery sequence in response to confirming the flameout event.

In another aspect, there is provided a system for detecting and responding to an engine disturbance. The system comprises at least one processor and a non-transitory computer-readable medium having stored thereon program instructions. The program instructions are executable by the at least one processor for monitoring a rate of change of a combustor pressure of an engine, detecting an engine disturbance when the rate of change of the combustor pressure falls below an event detection threshold, initiating an engine recovery sequence in response to detecting the engine disturbance, confirming a surge event when the rate of change of the combustor pressure increases above a surge confirmation threshold within a flameout confirmation time period after having crossed the event detection threshold, applying a surge recovery sequence in response to confirming the surge event, confirming a flameout event when the flameout confirmation time period expires and the rate of change of the combustor pressure remains below the surge confirmation threshold after having crossed the event detection threshold, and applying a flameout recovery sequence in response to confirming the flameout event.

Features of the systems, devices, and methods described herein may be used in various combinations, in accordance with the embodiments described herein. More particularly, any of the above features may be used together, in any combination.

DESCRIPTION OF THE DRAWINGS

Reference is now made to the accompanying figures in which.

It will be noted that throughout the appended drawings, like features are identified by like reference numerals

DETAILED DESCRIPTION

The present disclosure is directed to gas turbine engines and in particular, to the detection and response of engine disturbances such as engine surges and engine flameouts. The detection and response is applicable to various types of gas turbine engines, such as turbofan, turboshaft, turboprop, and turbojet engines, and includes auxiliary power sources (APU). The engines may be of a single or multi-spool architecture, with or without any type of variable geometry (such as bleed valves and compressor variable inlet guided vanes).

Figure 1:
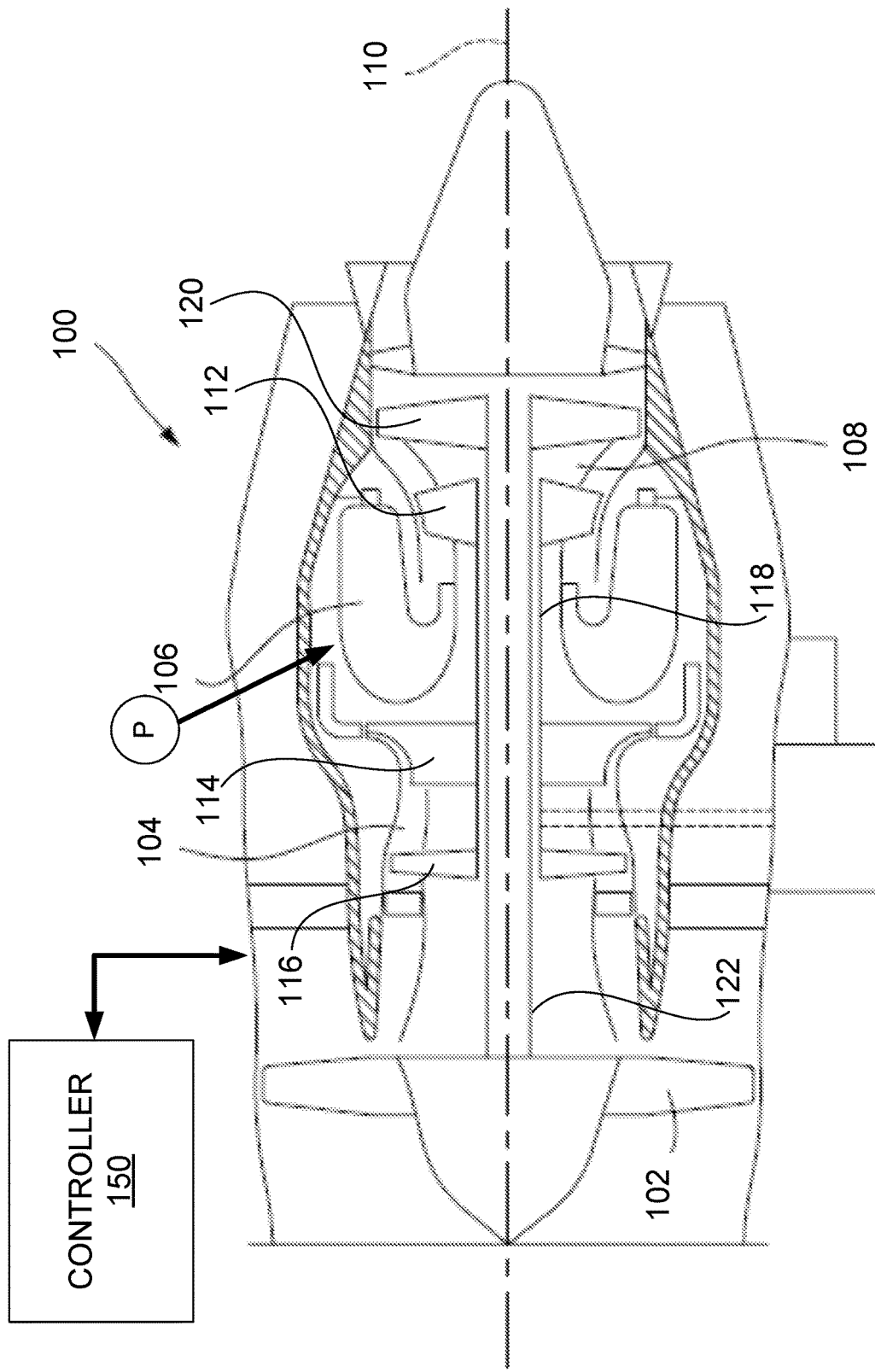
FIG. 1 is a schematic cross sectional view of a gas turbine engine.

FIG. 1 illustrates an example gas turbine engine 100 of a type typically provided for use in subsonic flight, generally comprising in serial flow communication a fan 102 through which ambient air is propelled, a compressor section 104 for pressurizing the air, a combustor 106 in which the compressed air is mixed with fuel and ignited for generating an annular stream of hot combustion gases, and a turbine section 108 for extracting energy from the combustion gases. High pressure rotor(s) 112 of the turbine section 108 are drivingly engaged to high pressure rotors 114 and 116 of the compressor section 104 through a high pressure shaft 118 that rotates about axis 110. Low pressure rotor(s) 120 of the turbine section 108 are drivingly engaged to the fan rotor 102 of the compressor section 104 through a low pressure shaft 122 extending within the high pressure shaft 118 and rotating independently therefrom about axis 110.

At least part of the operation of the engine 100 is controlled via a controller 150, which can be electrically and/or mechanically coupled to the engine 100 in any suitable fashion. For example, the controller 150 can be provided as one or more Full Authority Digital Engine Controller (FADEC) or similar device, including electronic engine control (EEC), engine control unit (ECU), electronic propeller control, propeller control unit, and the like. The controller 150 is configured for monitoring the operating parameters of the engine 100, detecting an engine disturbance based on the operating parameters, and applying a suitable engine recovery sequence.

The controller 150 is configured for detecting an engine disturbance and distinguishing between an engine surge and an engine flameout. An engine surge is a loss of control of the airflow in the compressor section 104 of the engine 100, causing airflow reversal towards the front of the engine 100.

Figure 2A:
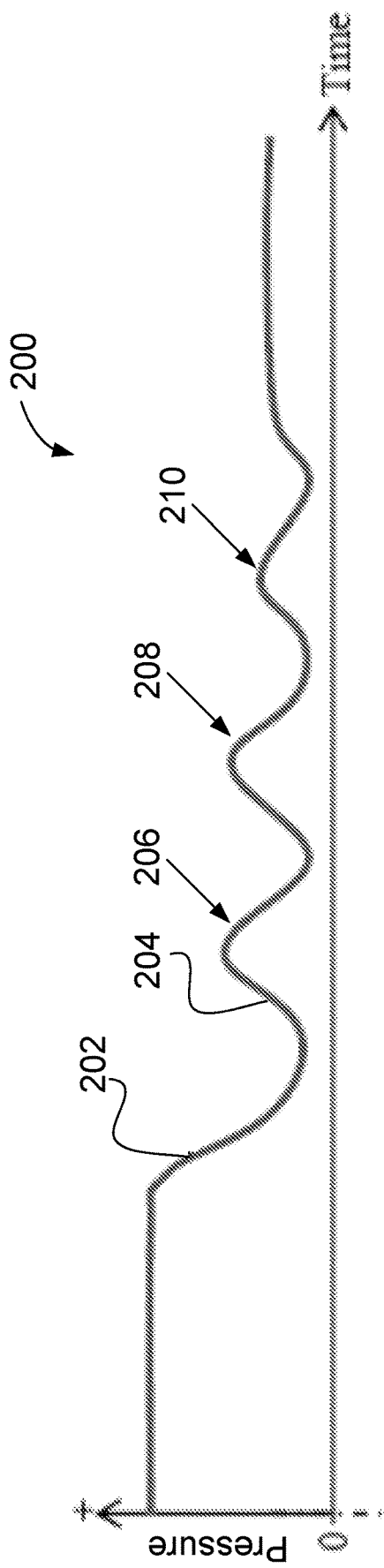
FIGS. 2A-2B are graphs illustrating an example of combustor pressure over time during an engine surge and an engine flameout, respectively.

It is the result of instability in the engine's operating cycle and may be caused by various factors, such as engine deterioration, ingestion of birds or ice, or other types of engine perturbations. The momentary flow reversal causes a sharp drop in combustor pressure, which may be measured, for example, between the compressor section 104 and the combustor 106 by one or more sensor(s) "P". When control of the flow is re-established, the compressor 104 resumes pumping and generating pressure, causing the combustor pressure to go back up. An example curve 200 representing the combustor pressure over time during an engine surge is illustrated in FIG. 2A. In this example, an initial decrease in pressure 202 is followed by an increase in pressure 204 as the engine begins to recover from the surge. One or more subsequent surges 206, 208, 210, may occur after the increase in pressure 204, and are shown to follow the same pattern of pressure decrease followed by pressure increase. The subsequent surges 206, 208, 210 may or may not occur, depending on engine specific parameters and on the circumstances surrounding the initial surge.

Figure 2B:
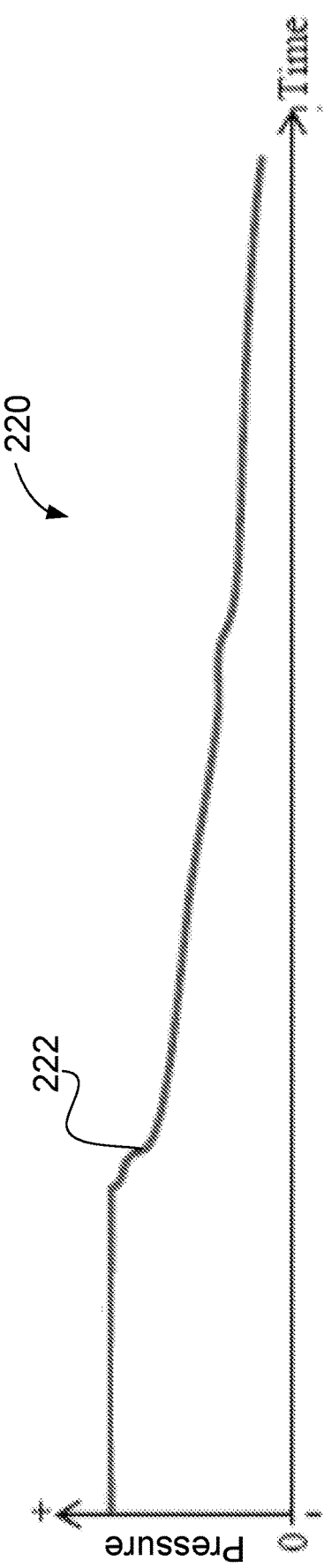

An engine flameout is a condition where the combustion process of the engine 100 within the combustor 106 has unexpectedly stopped. It may be caused by an inadvertent pilot manoeuvre or other factors which cause the flame in the combustor 106 to be lost. Contrary to an engine surge, an engine cannot recover from a flameout without a reignition as it is characterized by a loss of the flame. FIG. 2B illustrates an example curve 220 of the combustor pressure over time during an engine flameout. In this example, the pressure undergoes a slower and sustained decrease after an initial rapid decrease in pressure 222.

Figure 3A:
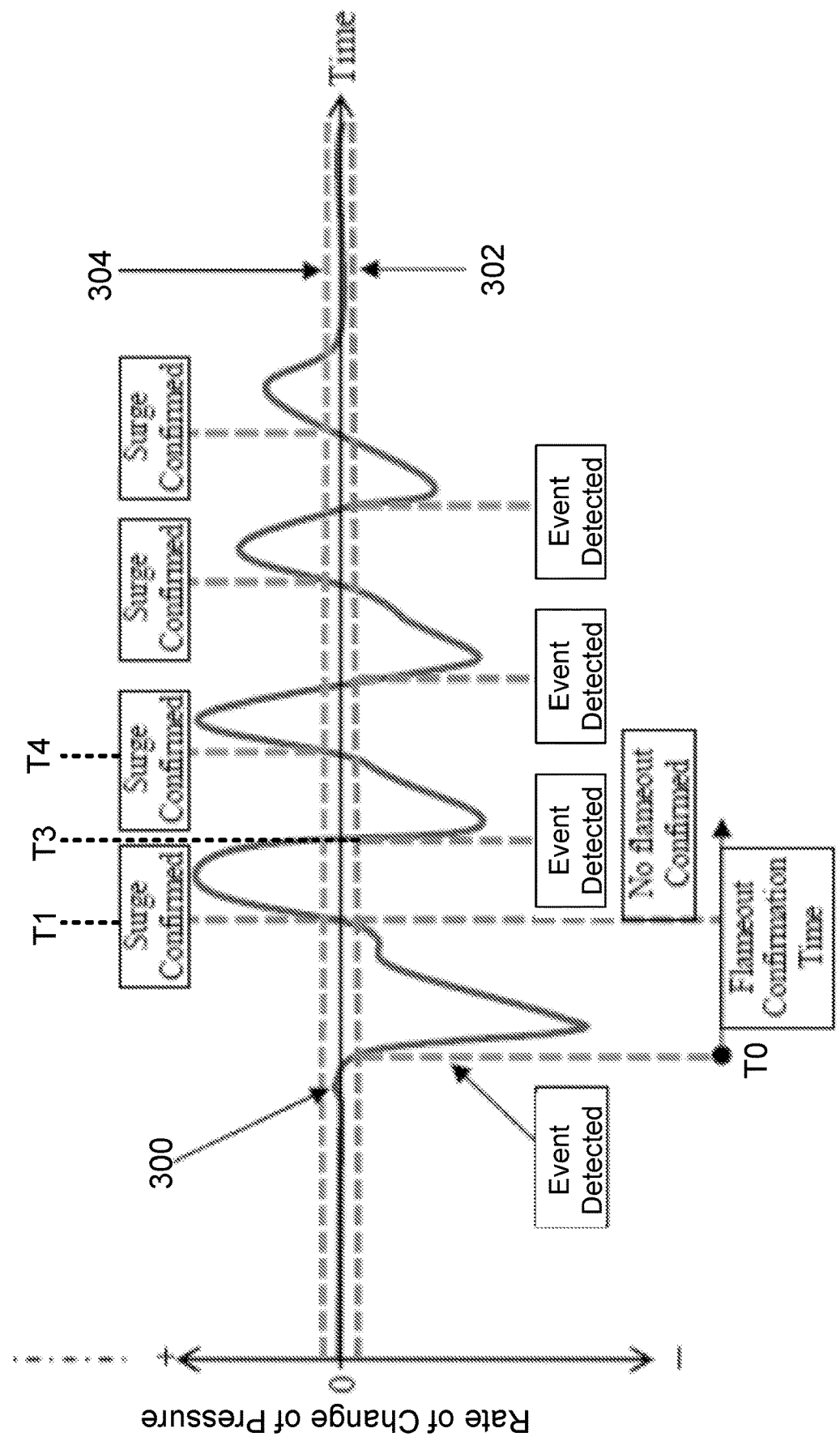
FIGS. 3A-3B are graphs illustrating a rate of change of the combustor pressure of FIGS. 2A-2B, respectively.
Figure 3B:
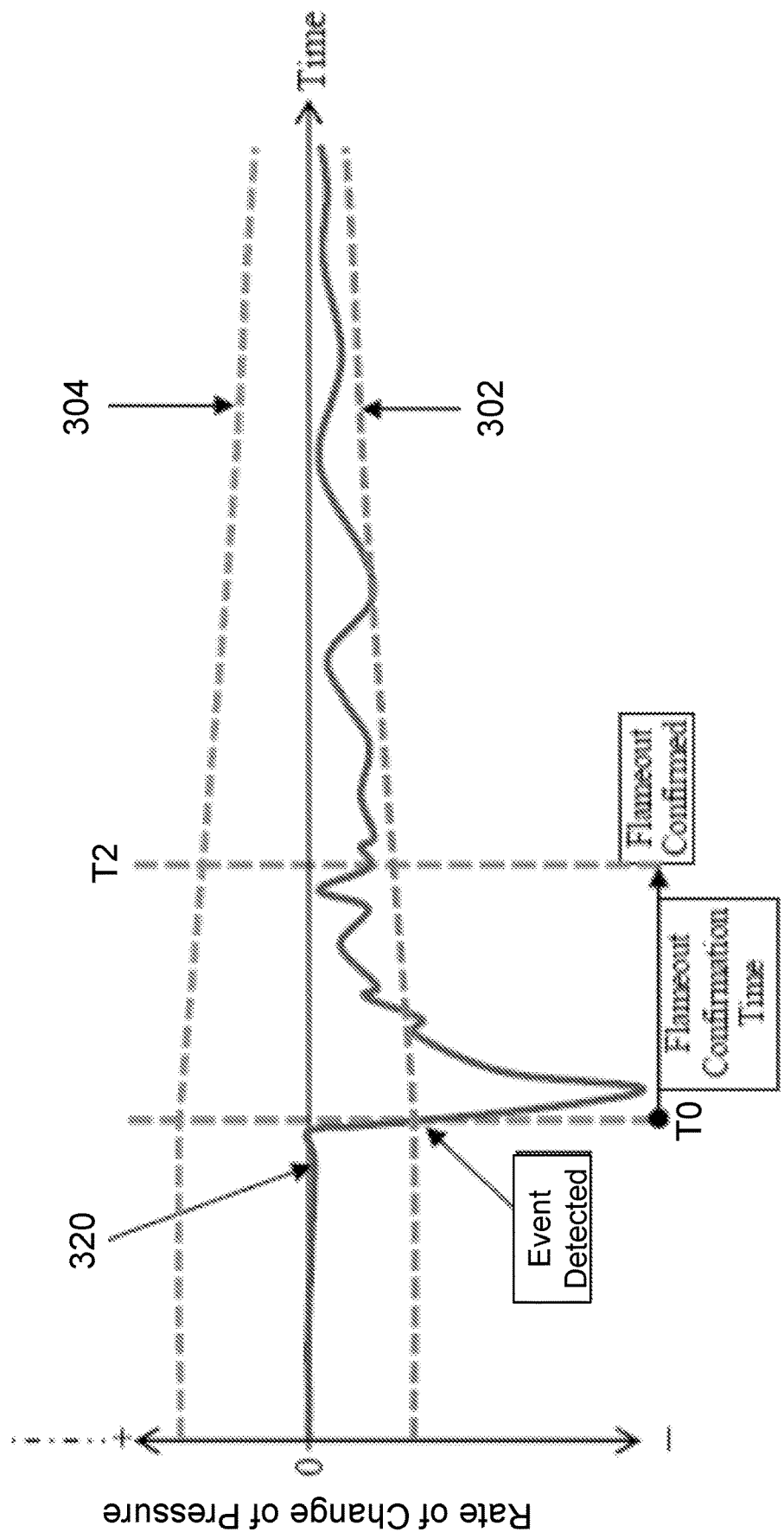

As can be seen from FIGS. 2A and 2B, the fluctuations in combustor pressure during the initial stages of a surge and a flameout are similar, but the behavior of the combustor pressure following the initial changes differs significantly. The differences in behavior are more clearly seen from the rate of change of the combustor pressure over time for both events, as illustrated in FIGS. 3A-3B. FIG. 3A illustrates an example curve 300 representing the rate of change of the combustor pressure over time during an engine surge as derived from the curve 200 of FIG. 2A. Two thresholds are used as trigger points of an engine disturbance detection process. The initial rapid decrease in pressure experienced at the outset of the engine surge causes the rate of change of the combustor pressure to fall below an event detection threshold 302, which triggers an initial detection of an engine disturbance (or event) at time T0. After the engine disturbance is detected, if the rate of change of the combustor pressure increases above a surge confirmation threshold 304 before reaching time T3, a surge event is confirmed at time T1.

FIG. 3B illustrates an example curve 320 representing the rate of change of the combustor pressure over time during an engine flameout as derived from the curve 220 of FIG. 2B. The initial rapid decrease in pressure experienced at the outset of the engine flameout causes the rate of change of the combustor pressure to fall below the event detection threshold 302, and thus trigger the initial detection of an engine disturbance (or event) at time T0. If the rate of change of the combustor pressure, after having fallen below the event detection threshold 302, does not rise above (i.e. stays below) the surge confirmation threshold 304 within a flameout confirmation time, a flameout is confirmed at time T2. Therefore, in the case of both a surge and a flameout, a first trigger point is used to detect an engine disturbance at T0, and a second trigger point is used to distinguish between a surge and a flameout, at T1 or T2. An engine recovery sequence can be applied as soon as an engine disturbance is detected at time T0, and adjusted accordingly once the event is confirmed to be a surge or a flameout.

An engine recovery sequence involves modulating fuel flow and/or applying changes to variable geometries of an engine. For example, fuel flow may be increased or decreased, and bleed valves or inlet guide vanes may be opened or closed. Since there are many similarities between the engine recovery sequence in the initial stages of a flameout and a surge, the controller 150 may be configured to apply a same engine recovery sequence upon detection of the engine disturbance, before confirming the event as a surge event or a flameout event based on the rate of change of the combustor pressure. The engine recovery sequence may be a surge recovery sequence that gets switched to a flameout recovery sequence when a flameout is confirmed at time T2. The engine recovery sequence may be a flameout recovery sequence that gets switched to a surge recovery sequence when a surge is confirmed at time T1. The engine recovery sequence may be neither a surge recovery sequence or a flameout recovery sequence but a general engine recovery sequence applicable to both a surge and a flameout for the initial recovery steps, and switched to either a surge recovery sequence at T1 or a flameout recovery sequence at T2 when one of the events has been confirmed. The engine recovery sequence may be reset, or reinitialized, once the engine disturbance has been confirmed as a surge or a flameout and is no longer being applied, i.e. a change in engine recovery sequence has occurred based on the confirmation of the nature of the event.

The event detection threshold 302 and surge confirmation threshold 304 may be constant or vary over time. In some embodiments, the event detection threshold 302 and/or the surge confirmation threshold 304 is adapted as a function of one or more engine parameter and/or flight condition, such as but not limited to low or high pressure rotor speeds, power, ambient temperature, pressure, and aircraft speed. The flameout confirmation time period, i.e. the time between T0 and T2, may be set using an expected oscillation frequency of a surge event, which may vary from one engine to another as a function of various engine parameters. Therefore, the flameout confirmation time period may be set to a value that is greater than the expected time for the rate of change of the combustor pressure to rise and cross the surge confirmation threshold 304. A suitable balance is struck between having a buffer beyond the expected time for a surge and needing to address a flameout with a reignition. The flameout confirmation time period may be set to a constant or vary according to one or more engine parameter and flight condition.

The controller 150 may be configured to reset the detection logic and repeat the two-step detection when subsequent surges occur before the engine has fully recovered from a surge. As illustrated in FIG. 3A, a new event may be detected at time T3 when the rate of change of the combustor pressure falls below the event detection threshold 302, and a new surge confirmed at time T4 when the rate of change increases above the surge confirmation threshold 304 after having fallen below the event detection threshold 302.

In some embodiments, a flameout event is prioritized over a surge, such that once a flameout has been confirmed, a surge cannot be detected until at least one sign of flameout recovery is detected. Surge detection is thus inhibited in response to confirming the flameout event, and uninhibited when flameout recovery is detected. In this scenario, if a surge were to occur following flameout confirmation and before combustion is re-established, it would be ignored to prioritize relighting of the engine. Various parameters may be used to detect flameout recovery, such as but not limited to an increase in engine temperature, such as at the exit of the turbine section 108 (also known as station-T5), an increase in the rotational speed of the high pressure spool (also known as N2), the combustor pressure reaching a certain level, and the like. Conversely, a flameout detected following detection of an engine surge and before the engine has recovered from the surge would not be ignored, as the priority is to relight the engine.

In some embodiments, one or more additional criteria is used to confirm flameout. This may be useful, for example, in the lower power domain, where it may be more difficult to confirm the flameout due to very low combustor pressure fluctuations. For example, flameout may be confirmed based on a drop in exhaust gas temperature, low or high pressure rotor speeds or derivatives, or engine pressure ratio. Alternatively or in combination therewith, the flameout and/or the surge detection logic based on burner pressure rate of change may be disabled within certain ranges of engine operation, for example based on N2, combustor pressure, or other parameters.

Figure 4A:
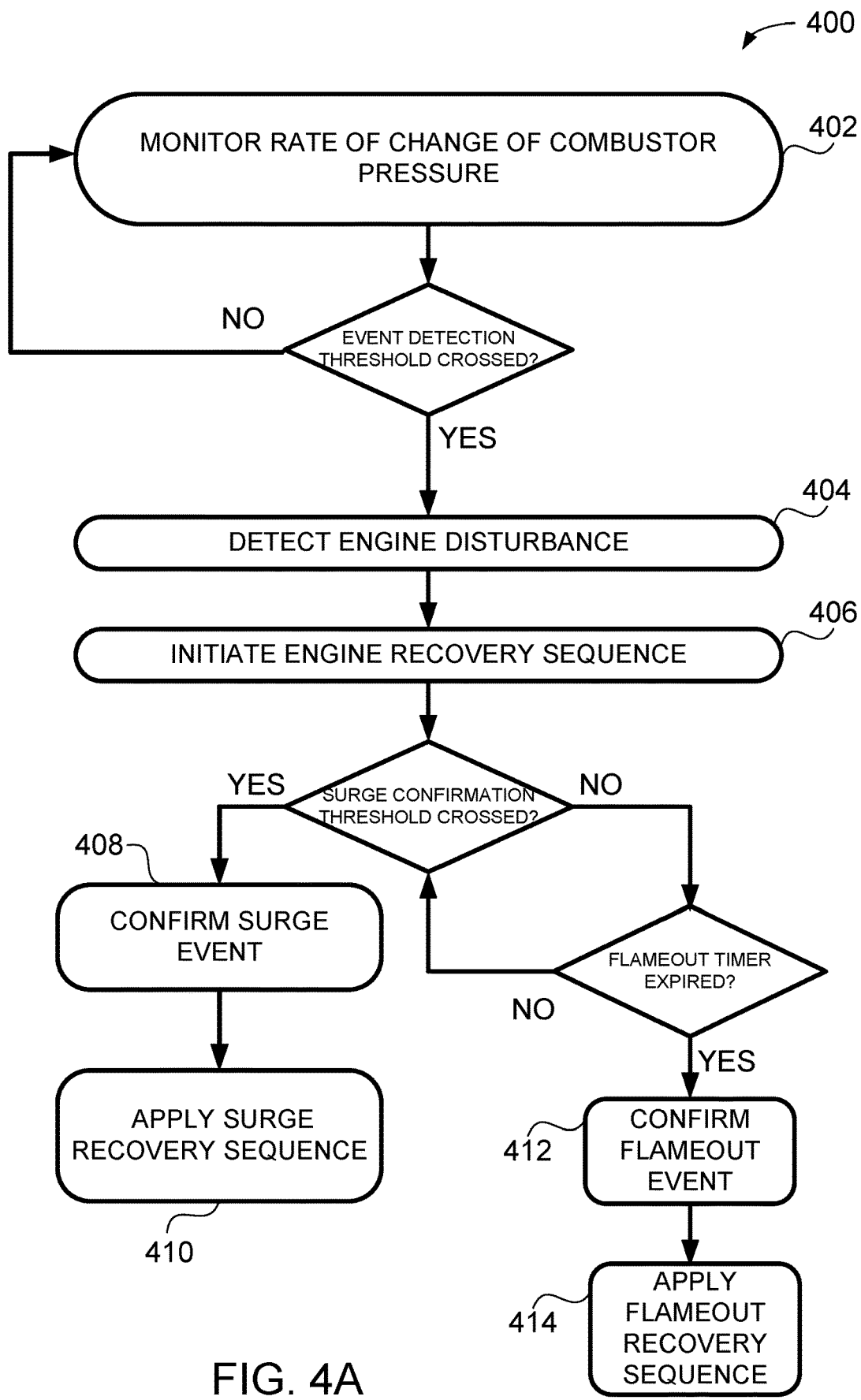
FIGS. 4A-4B are flowcharts of an example method for detecting and responding to an engine disturbance.

With reference to FIG. 4A, there is illustrated an example method 400 for detecting and responding to an engine disturbance, as performed for example by the controller 150. At step 402, the rate of change of the combustor pressure of the gas turbine engine is monitored. An engine disturbance is detected at step 404 when an event detection threshold is crossed, and an engine recovery sequence is initiated at step 406 in response to the detected engine disturbance. A surge event is confirmed at step 408 when the rate of change of the combustor pressure increases above a surge confirmation threshold within a flameout confirmation time period (flameout timer) and a surge recovery sequence is applied at step 410 in response to confirming the surge. If the flameout timer expires and the surge confirmation threshold has not been crossed, then a flameout is confirmed at step 412. A flameout recovery sequence is applied at step 414 in response to confirming the flameout.

In some embodiments, the engine recovery sequence initiated at step 406 corresponds to the surge recovery sequence. In this scenario, a surge is assumed when the engine disturbance is detected and then confirmed when the rate of change of the combustor pressure increases above the surge confirmation threshold within the flameout confirmation time period. Step 408 of applying the surge recovery sequence would then correspond to a continued application of the surge recovery sequence. If instead a flameout is confirmed, the surge recovery sequence is reset and the flameout recovery sequence is initiated at step 414.

Figure 4B:
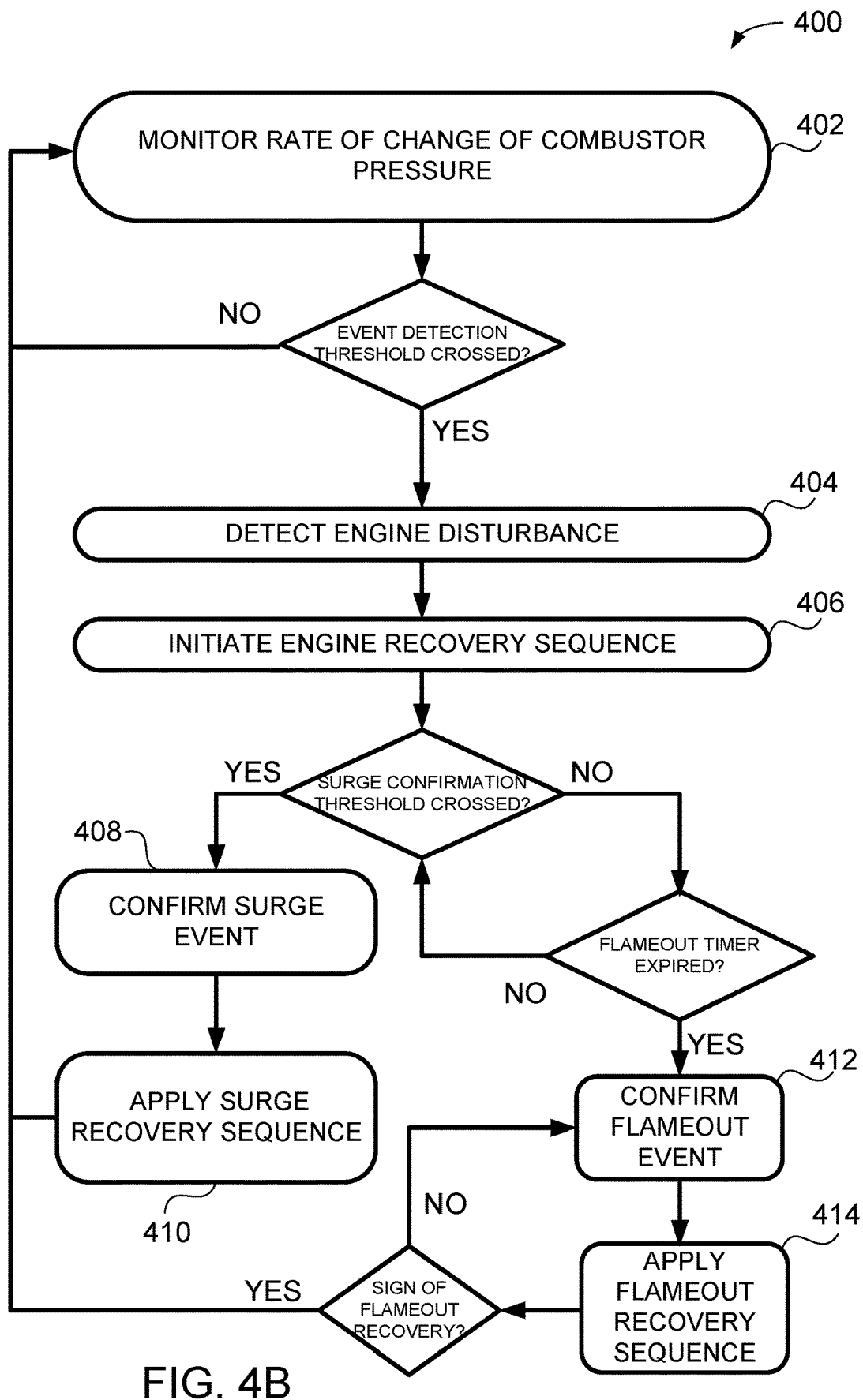

In some embodiments, and as illustrated in FIG. 4B, once the flameout recovery sequence is applied at step 414, the method 400 only returns to step 402 of monitoring the rate of change of the combustor pressure when at least one sign of flameout recovery is detected. In other words, detection of an engine disturbance is inhibited until flameout recovery is well under way. In this example, the entire method 400 is repeated if another engine disturbance is detected (i.e. the event detection threshold is crossed again) once the surge has been confirmed at step 408 and the surge recovery sequence applied at step 410.

In some embodiments, one or more additional flameout detection methods are used in combination with the method described herein. Other flameout detection methods can be active in parallel as long as they do not interfere with the method 400, and can act as back-up detection methods in case there are any issues with pressure readings of the sensor(s), or in case of very low pressure fluctuations that would make it difficult to confirm a flameout. For example, flameout detection logic based on the decay rate of the high pressure spool (N2dot) of the engine or on the sub-idle operation of the engine may be used as backup or secondary mechanisms for detecting the flameout and/or confirming the flameout. Detection of an engine disturbance based on the method 400 may cause detection logic based on N2dot to be disabled, or inhibited, until either a sign of engine recovery is detected or until the engine is fully recovered, to prevent any interferences between the two detection methods. This may apply to other detection methods as well.

In some embodiments, the method 400 may be adapted based on one or more parallel detection logics. For example, detection of a flameout based on N2dot or sub-idle may cause the method 400 to be inhibited, or disabled, until either a sign of flameout recovery is detected or until the engine is fully recovered from the flameout. Full recovery may be measured using various parameters, such as but not limited to the engine returning to a power level at which it was operating prior to detecting an engine disturbance. In another example, if a flameout based on sub-idle operation is detected at any time during the method 400, for example after the engine recovery sequence is initiated at step 406, or after the surge recovery sequence is applied at step 410 (before or after a sign of surge recovery is detected), the method 400 may jump immediately to step 414 to apply the flameout recovery sequence. Other embodiments may apply depending on practical implementation.

Figure 5:
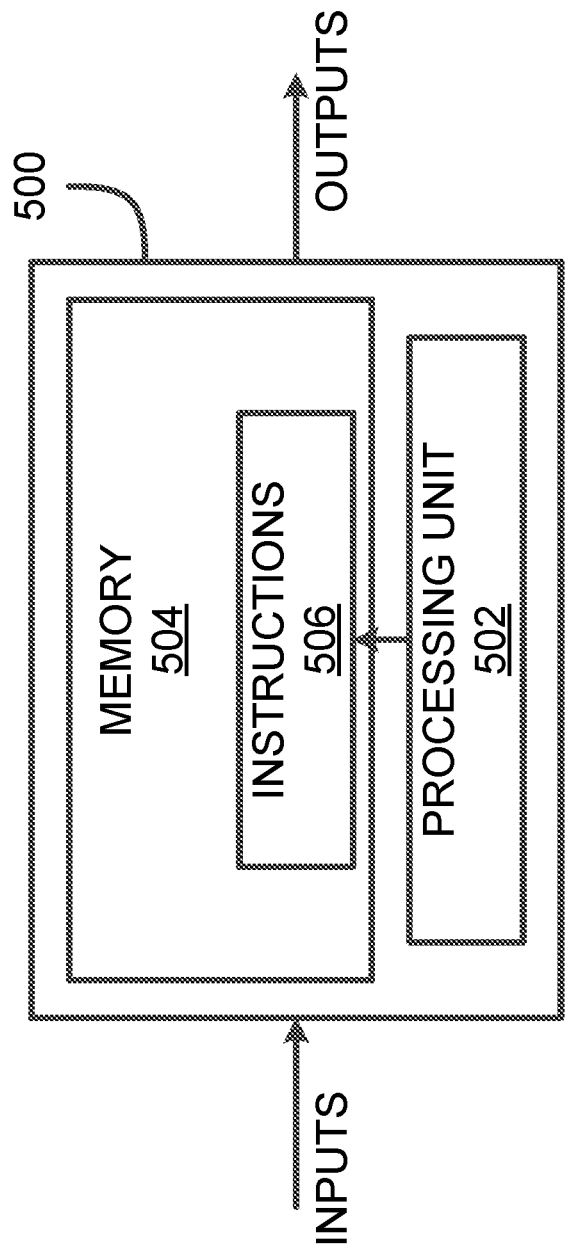
FIG. 5 is a block diagram of an example computing device.

The controller 150 may be implemented with one or more computing device 500, an example of which is illustrated in FIG. 5. For simplicity only one computing device 500 is shown but the controller 150 may be implemented by a plurality of the computing devices 500. The computing devices 500 may be the same or different types of devices. Note that the controller 150 can be implemented as part of a full-authority digital engine controls (FADEC) or other similar device, including electronic engine control (EEC), engine control unit (ECU), electronic propeller control, propeller control unit, and the like.

The computing device 500 comprises a processing unit 502 and a memory 504 which has stored therein computer-executable instructions 506. The processing unit 502 may comprise any suitable devices configured to implement the method 400 such that instructions 506, when executed by the computing device 500 or other programmable apparatus, may cause the functions/acts/steps performed as part of the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for detecting and responding to an engine disturbance described herein may be implemented in a high level procedural or object oriented programming or scripting language, or a combination thereof, to communicate with or assist in the operation of a computer system, for example the computing device 500. Alternatively, the methods and systems for detecting and responding to an engine disturbance may be implemented in assembly or machine language. The language may be a compiled or interpreted language. Program code for implementing the methods and systems for detecting and responding to an engine disturbance may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting and responding to an engine disturbance may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, if judged beneficial for the engine recovery process, various reset conditions may be used to prioritize a surge recovery if a surge were to occur during the reacceleration phase following a flameout or quick relight, so that both recovery sequences are not acting in parallel. Yet further modifications could be implemented by a person of ordinary skill in the art in view of the present disclosure, which modifications would be within the scope of the present technology.

The invention claimed is:

1. A method for detecting and responding to an engine disturbance, the method comprising:
    monitoring a rate of change of a combustor pressure of an engine;
    detecting the engine disturbance when the rate of change of the combustor pressure falls below an event detection threshold;
    initiating an engine recovery sequence in response to detecting the engine disturbance;
    confirming a surge event when the rate of change of the combustor pressure increases above a surge confirmation threshold within a flameout confirmation time period after having crossed the event detection threshold;
    applying a surge recovery sequence in response to confirming the surge event;
    confirming a flameout event when the flameout confirmation time period expires and the rate of change of the combustor pressure remains below the surge confirmation threshold after having crossed the event detection threshold; and
    applying a flameout recovery sequence in response to confirming the flameout event.

2. The method of claim 1, wherein the engine recovery sequence is the surge recovery sequence, and further comprising resetting the surge recovery sequence in response to confirming the flameout event.

3. The method of claim 1, wherein the detecting of the engine disturbance is inhibited in response to confirming the flameout event, and uninhibited when at least one sign of flameout recovery is detected.

4. The method of claim 1, further comprising detecting a subsequent engine disturbance and reinitiating the engine recovery sequence when the rate of change of the combustor pressure falls below the event detection threshold after the confirming of the surge event.

5. The method of claim 1, wherein the detecting of the engine disturbance is inhibited when the engine is operating in a subset of engine operating parameters.

6. The method of claim 1, wherein at least one additional parameter is detected in combination with the rate of change of the combustor pressure to detect the engine disturbance, confirm the surge event, or confirm the flameout event.

7. The method of claim 1, further comprising detecting the flameout event based on at least one of a rate of change of a rotational speed of a high pressure turbine of the engine and a sub-idle operation of the engine.

8. The method of claim 7, wherein the detecting of the flameout event based on the rate of change of the rotational speed of the high pressure turbine is inhibited in response to detecting the engine disturbance.

9. The method of claim 8, wherein the detecting of the flameout event based on the rate of change of the rotational speed of the high pressure turbine is uninhibited when at least one sign of engine recovery is detected.

10. The method of claim 7, wherein the engine recovery sequence or the surge recovery sequence is reset in response to detecting the flameout event.

11. A system for detecting and responding to an engine disturbance, the system comprising:
    at least one processor; and
    a non-transitory computer-readable medium having stored thereon program instructions executable by the at least one processor for:
    monitoring a rate of change of a combustor pressure of an engine;
    detecting the engine disturbance when the rate of change of the combustor pressure falls below an event detection threshold;
    initiating an engine recovery sequence in response to detecting the engine disturbance;
    confirming a surge event when the rate of change of the combustor pressure increases above a surge confirmation threshold within a flameout confirmation time period after having crossed the event detection threshold;
    applying a surge recovery sequence in response to confirming the surge event;
    confirming a flameout event when the flameout confirmation time period expires and the rate of change of the combustor pressure remains below the surge confirmation threshold after having crossed the event detection threshold; and
    applying a flameout recovery sequence in response to confirming the flameout event.

12. The system of claim 11, wherein the engine recovery sequence is the surge recovery sequence, and wherein the program instructions are further executable for resetting the surge recovery sequence in response to confirming the flameout event.

13. The system of claim 11, wherein the detecting of the engine disturbance is inhibited in response to confirming the flameout event, and uninhibited when at least one sign of flameout recovery is detected.

14. The system of claim 11, wherein the program instructions are further executable for detecting a subsequent engine disturbance and reinitiating the engine recovery sequence when the rate of change of the combustor pressure falls below the event detection threshold after the confirming of the surge event.

15. The system of claim 11, wherein the detecting of the engine disturbance is inhibited when the engine is operating in a subset of engine operating parameters.

16. The system of claim 11, wherein at least one additional parameter is detected in combination with the rate of change of the combustor pressure to detect the engine disturbance, confirm the surge event, or confirm the flameout event.

17. The system of claim 11, wherein the program instructions are further executable for detecting the flameout event based on at least one of a rate of change of a rotational speed of a high pressure turbine of the engine and a sub-idle operation of the engine.

18. The system of claim 17, wherein the detecting of the flameout event based on the rate of change of the rotational speed of the high pressure turbine is uninhibited when at least one sign of engine recovery is detected.

19. The system of claim 18, wherein the detecting of the flameout event based on the rate of change of the rotational speed of the high pressure turbine is uninhibited when at least one sign of surge recovery is detected.

20. The system of claim 17, wherein the engine recovery sequence or the surge recovery sequence is reset in response to detecting the flameout event.

* * * * *